United States Patent
Bandemer

(10) Patent No.: US 7,107,278 B1
(45) Date of Patent: Sep. 12, 2006

(54) SYSTEM AND METHOD FOR MANAGING OBSERVATIONAL INFORMATION ITEMS

(75) Inventor: Michael R. Bandemer, San Diego, CA (US)

(73) Assignee: CD-LIT Solutions, LLC, San Diego, CA (US)

(*) Notice: Subject to any disclaimer, the term of this patent is extended or adjusted under 35 U.S.C. 154(b) by 0 days.

(21) Appl. No.: 09/309,366

(22) Filed: May 11, 1999

(51) Int. Cl.
 *G06F 7/00* (2006.01)
(52) U.S. Cl. .................. 707/102; 707/104.1; 703/1
(58) Field of Classification Search ............ 705/1, 705/3; 707/102, 103 R, 1, 104.1; 703/1; 345/441, 467
 See application file for complete search history.

(56) References Cited

U.S. PATENT DOCUMENTS

| | | | | |
|---|---|---|---|---|
| 4,264,808 A | 4/1981 | Owens et al. | ............... | 235/379 |
| 4,553,206 A | 11/1985 | Smutek et al. | ............... | 364/300 |
| 4,633,430 A | 12/1986 | Cooper | ................. | 364/900 |
| 5,020,019 A | 5/1991 | Ogawa | ................. | 364/900 |
| 5,159,180 A | 10/1992 | Feiler | ................. | 235/375 |
| 5,241,671 A | 8/1993 | Reed et al. | ................. | 395/600 |
| 5,392,428 A | 2/1995 | Robins | ................. | 395/600 |
| 5,414,644 A | 5/1995 | Seaman et al. | ........ | 364/551.01 |
| 5,467,444 A * | 11/1995 | Kawamura et al. | ......... | 345/441 |
| 5,508,912 A | 4/1996 | Schneiderman | ............ | 364/401 |
| 5,710,900 A | 1/1998 | Anand et al. | ............... | 395/339 |
| 5,721,691 A * | 2/1998 | Wuller et al. | ............... | 703/1 |
| 5,721,903 A | 2/1998 | Anand et al. | ............... | 395/605 |
| 5,729,741 A | 3/1998 | Liaguno et al. | ............. | 395/615 |
| 5,748,899 A | 5/1998 | Aldrich | ................ | 395/200.52 |
| 5,806,079 A | 9/1998 | Rivette et al. | ............. | 707/512 |
| 5,819,259 A | 10/1998 | Duke-Moran et al. | ......... | 707/3 |
| 5,832,495 A * | 11/1998 | Gustman | .................... | 707/102 |
| 5,838,966 A | 11/1998 | Harlan | ................ | 395/615 |
| 5,845,301 A | 12/1998 | Rivette et al. | ............. | 707/512 |
| 5,848,202 A | 12/1998 | D'Eri et al. | ................ | 382/306 |
| 5,855,005 A * | 12/1998 | Schuler et al. | ................. | 705/4 |
| 5,875,431 A | 2/1999 | Heckman et al. | ............. | 705/7 |
| 5,884,284 A | 3/1999 | Peters et al. | .................. | 705/30 |
| 5,930,773 A | 7/1999 | Crooks et al. | ............... | 705/30 |
| 6,038,547 A * | 3/2000 | Casto | ......................... | 705/30 |

* cited by examiner

*Primary Examiner*—Sam Rimell
(74) *Attorney, Agent, or Firm*—Knobbe, Martens, Olson & Bear, LLP

(57) ABSTRACT

The present invention includes an observation management system for the organization of documents and observational information items relating to construction defect litigation. The observation manage system receives as an input various items of observational information that describe one or more building defects. After being input, the observational items are organized for indexing and retrieval purposes. The observation management system allows for the on-line display of each of the items of observational information. Further, the observation management system provides a utility for assigning responsibility to each of the noted defects to one or more subcontractors that may have caused the defects.

18 Claims, 15 Drawing Sheets

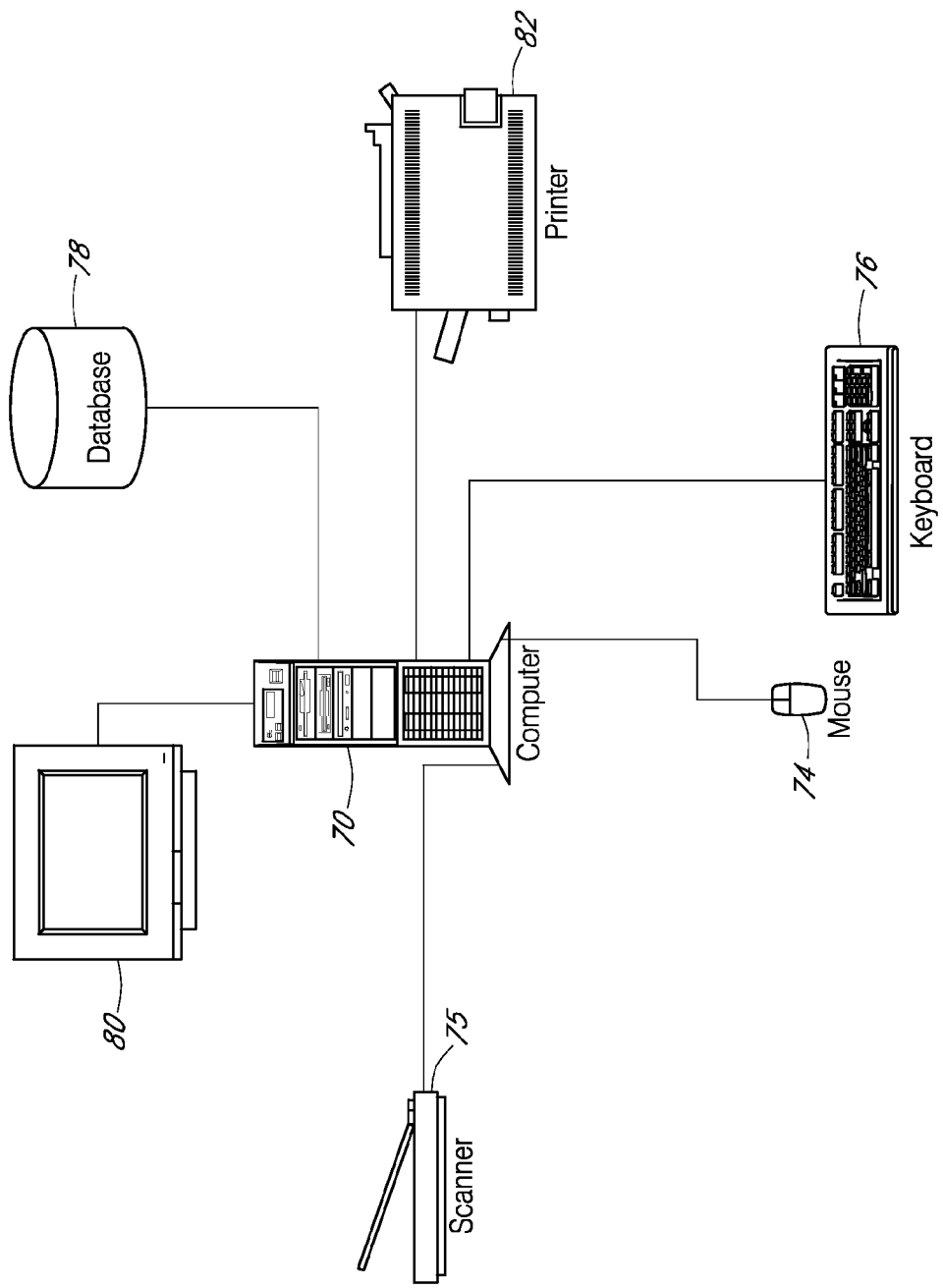

FIG. 5C

Evidence Photo Report

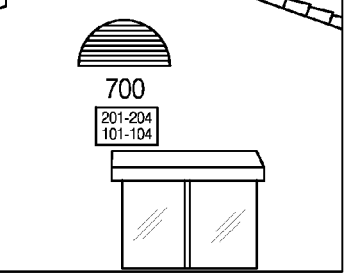

| | |
|---|---|
| ObservationDate | 6/23/98 |
| Company | Perry & Perry |
| InspectorInit | RT |
| DefectCode | |
| DefectDescription | |
| Phase | 5 |
| Address | 700 Wheat Ridge Lane Unit 201 |
| Building | 0 |
| Unit | 201 |
| Doc Number | P00001RT.jpg |
| Comments | Bldg # |

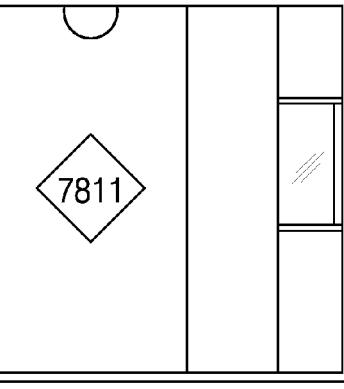

| | |
|---|---|
| ObservationDate | 6/24/98 |
| Company | Perry & Perry |
| InspectorInit | JP |
| DefectCode | |
| DefectDescription | |
| Phase | 3 |
| Address | 7811 Gable |
| Building | 0 |
| Unit | |
| Doc Number | P00002JP.jpg |
| Comments | |

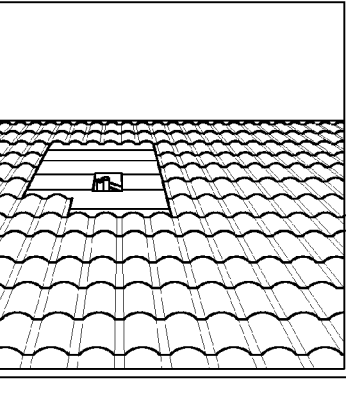

| | |
|---|---|
| ObservationDate | 6/23/98 |
| Company | Perry & Perry |
| InspectorInit | RP |
| DefectCode | |
| DefectDescription | |
| Phase | 5 |
| Address | 700 Wheat Ridge Lane UNit 201 |
| Building | 0 |
| Unit | 201 |
| Doc Number | P00002RP.jpg |
| Comments | Dormer vent d faxed # 1 |

*Wednesday, December 16, 1998*

FIG. 11

SYSTEM AND METHOD FOR MANAGING OBSERVATIONAL INFORMATION ITEMS

BACKGROUND OF THE INVENTION

1. Field of the Invention

The invention pertains to the field of document tracking. More particularly, the invention pertains to a system and a method for organizing and managing observational information items relating to construction defect litigation.

2. Description of the Related Technology

Litigation is a very complex process that usually includes the management of numerous documents and complex and voluminous data. To assist managing these large numbers of documents and complex and voluminous data, various general litigation support systems have been developed. These general litigation support systems usually operate by providing and recording a unique identifier for each document in a lawsuit. Most of these documents have been optically scanned into the computer as bit-mapped images, which rely upon computer software to automatically correlate and track these documents. Although these general litigation support systems provide limited document tracking capability, they fail to adequately meet the needs of litigation support personnel in handling specialized types of litigation.

In particular, the success of these litigation support systems in managing information relating to construction defect litigation and other types of claims has been limited. In construction defect litigation, for example, each litigant participating in a lawsuit sends a number of inspectors representing various specialties to a building site having alleged construction defects. Each of these inspectors then prepares various reports that describe their findings regarding the defects. In support of these reports, the inspector typically gathers data, prepares photographs, makes sketches, tests, performs and makes other observational notes and comments regarding each of the potential defects or observation notes.

However, current litigation support systems are not designed to manage litigation documents in construction litigation and do not provide for the cross referencing of data and documents. During and in preparation of construction defect litigation, litigation support personnel need to know the defects that have been identified, the location of the defect, the type of defect, a picture or sketch of the defect, the positioning of an inspector relative to the structure of the building when the inspector photographed the defect, and access to floor plan which can cross-correlate the defects with inspector's noted observational information.

Another problem associated with current litigation systems is that they do not allow the on-line retrieval and display of graphical documents including pictures, sketches and charts. For example, U.S. Pat. No. 5,159,180 to Feiler describes a typical general litigation support system. Feiler describes a bibliographic system that uses bar code numbers to cross-correlate and index information. Using the Feiler system, a user can only obtain bibliographic information, and it is not possible to obtain on-line access to the litigation documents. Thus, if a document was identified in the Feiler system, the user could not display the document. The user would have to go to a filing cabinet or other document storage device to actually see the information that is contained in the identified document.

Further, general litigation support systems, such as is described by Feiler do not describe how to manage and cross-correlate the observational information of inspectors. In construction litigation, each item of observational information is cross-referenced with a plan of the building. Feiler and other general litigation support systems do not teach how to manage these types of documents in a computerized environment.

In addition, these general litigation support systems do not provide for the management of accounting information relating to the construction litigation. In construction litigation, there is a need to assign responsibility to a specific subcontractor for the correction of a defect. This assignment process is complicated by the fact that various contractors may have worked on a building complex, such as found in condominiums, during a selected phase of its construction. However, the general litigation support systems, such as are described by Feiler, cannot assign responsibility for the costs of fixing the construction defects that were noted by the inspectors.

Therefore, there is a need for a management system that provides for the management of documents related to construction litigation. The management system should display the full text of the managed litigation documents. Also, the management system should support the cross-correlation of observational information with a building plan. Additionally, the management system should allow for the assignment of responsibility for defects that are identified at a particular building site to one or more subcontractors depending on which phase of the construction that the subcontractor was a participant.

SUMMARY OF THE INVENTION

The observation management system of the present invention has a number of aspects, no single one of which is solely responsible for its desirable attributes. Without limiting the scope of this invention as expressed by the claims which follow, certain aspects of the invention will now be discussed briefly.

One embodiment of the invention includes a method of organizing information in a computer, comprising assigning an object identifier to a graphical representation of a physical object, providing at least one item of observational information that is related to the physical object, assigning at least one observational identifier to the observational information, annotating the graphical representation of the physical object with the observational identifier, and associating in the computer the object identifier to the observational identifier.

Another embodiment of the invention includes a system for managing information, the system comprising a plurality of observational information items relating to a physical object, an annotated graphical representation of the physical object, the annotated graphical representation illustrating the location of an individual that provided the observational information, and an information retrieval system for displaying the observational information and the annotated graphical representation.

BRIEF DESCRIPTION OF THE DRAWINGS

FIG. 1B is a block diagram of a computer that may be used with the observational management shown in FIG. 1A.

FIG. 5C is a screen display that allows a user select one or more photos that are stored in the observation management system of FIG. 1A.

FIG. 11 is an exemplary report that is generated by the observation management system of FIG. 1A.

DETAILED DESCRIPTION OF EMBODIMENTS OF THE INVENTION

The following detailed description is directed to certain specific embodiments of the invention. However, the invention can be embodied in a multitude of different ways as defined and covered by the claims. The present invention may be described as a system and a method for maintaining, organizing and retrieving documents related to construction defect litigation. Using the present invention, attorneys and other service providers assisting in construction defect litigation can organize various documents related to construction litigation. Using the present invention, an individual can retrieve building plans, roof plans, unit plans, elevation plans, notes, sketches, photographs and the like, of a selected site having construction defects. Further, the system of the present invention organizes the information relating to building or other structural defects such that information related to the defects is easily obtainable. Once organized, the information can be selectively retrieved according to a specified lot, location, expert, trade and/or subcontractor. The system allows the user to associate a particular photo or sketch with the information such that that the photo/sketch can be easily retrieved for later use. For example, the photo or sketch may be retrieved at the time of mediation or trial. The system effectively organizes the information in a single display (i.e., photos, notes, sketches, plans, etc.). This is to be contrasted against other systems that require the use of binders and boxes that are cumbersome to manage and inefficient to access.

System Overview

Figure 1A:
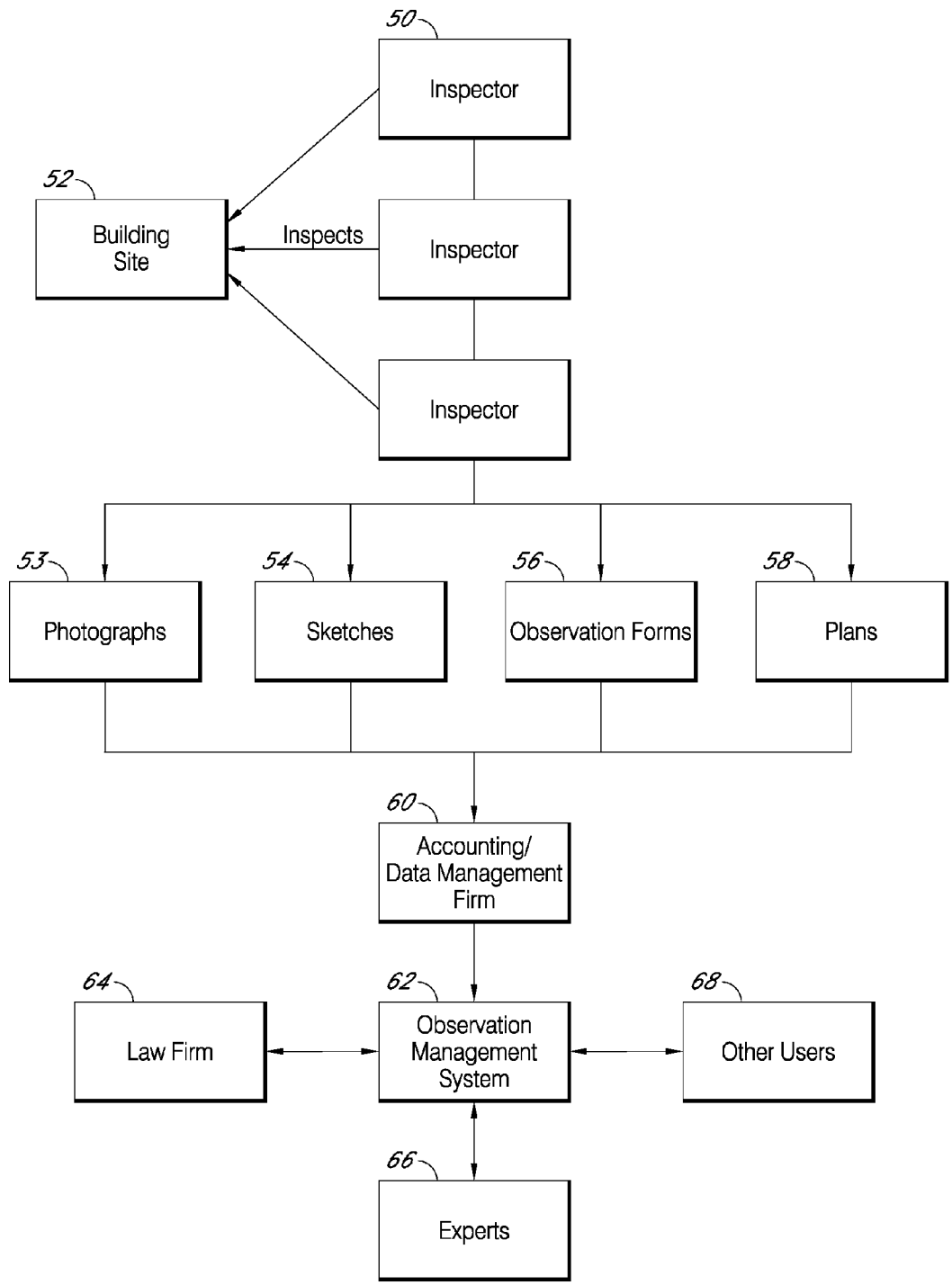
FIG. 1A is a representational diagram that illustrates one exemplary use of a observation management system of the present invention in conjunction with construction defect litigation.

FIG. 1A illustrates one exemplary use of the observation management system in connection with construction defect litigation. According to the present invention, one or more inspectors 50 visit a building site 52 having construction defects. The inspector 50 prepares at least one observation form 56 that describes his findings regarding the construction defects. In support of the completed form 56, the inspector 50 may take one or more photographs 53 or free-hand draw one or more sketches 54. The inspector 50 also notes his position on a copy of one or more plans 58 the positioning of the inspector 50 when the he noted the information on the observation form 56 or when he photographed the defect.

The photographs 53, the sketches 54, the observations form 56, and the plans 58 are then forwarded to an accounting firm 60 or data management company for input into an observation management system 62 of the present invention 56. During the data input process, the observational information items are automatically cross-correlated for indexing and retrieval purposes. The observation management system 62 allows for the on-line display of each of the items of observational information. Further, the observation management system 62 provides a method for assigning a trade responsibility to each of the noted defects. Based on a given lot/address, the observation management system 62 also assigns responsibility to the subcontractor that performed the given trade at the lot/address being selected.

Once the foregoing materials are converted and input into the observation management system 62, a law firm 64, expert witnesses 66, and other users 68 can readily extract the observational information. Further, as will be described below, the observation management system 62 may be used to generate reports regarding the observational information.

FIG. 1B is a block diagram illustrating a computer 70 that may be used with the observation management system 62 (FIG. 1A). The computer 70 is connected to one or more input devices, such as a mouse 74 and a keyboard 76. The computer 70 is also attached to a scanner 75 that may be used to create a digital image of the sketches 54, the observation form 56, and the plans 58. The computer 70 also includes a database 78 that may be used to organize and store the observational information items.

In addition, the computer 70 is attached to a printer 80 and a display 82. Upon a user request, the display 80 can show a copy of the photographs 53, sketches 54, the observation forms 56, and the plans 58. The display 80 can also show a report that has been generated by the observation management system 62 (FIG. 1A). The printer 82 may be used to print any of the information that is shown by the display 80.

The computer 70 may have a conventional general purpose single- or multi-chip microprocessor such as a Pentium processor, a Pentium Pro processor, a 8051 processor, a MPS processor, a Power PC processor, or an ALPHA processor. In addition, the computer 70 may be any conventional special purpose microprocessor such as a digital signal processor or a graphics processor. The computer 70 may operate with various operating systems such as: UNIX, Disk Operating System (DOS), OS/2, Windows 3.X, Windows 95, Windows 98 and Windows NT. Furthermore, the computer 70 may be a computing environment formed from a network of computers such as a local area network (LAN), intranet or Internet.

The database 78 can be any off-the-shelf or proprietary database. In one embodiment of the invention, the database 78 is Access from Microsoft. The database 78 may be accessed by one or more computer programs (not shown) that reside on the computer 70. In one embodiment of the invention, the computer programs are coded using Visual Basic. However, it is to be appreciated that the computer programs can include code in any programming language such as C, C++, Pascal, Java, and FORTRAN. C, C++, Pascal, Java, and FORTRAN are industry standard programming languages for which many commercial compilers and interpreters can be used to create executable code.

In one embodiment of the invention, the observation management system 62 is connected to network, such as the Internet. Using the network, an individual at a client computer can remotely access the information that is maintained by the observation management system 62. In one embodiment of the invention, the client computer accesses the observation management system 62 through an Internet browser, such as Netscape Navigator or Microsoft's Internet Explorer.

Figure 2A:
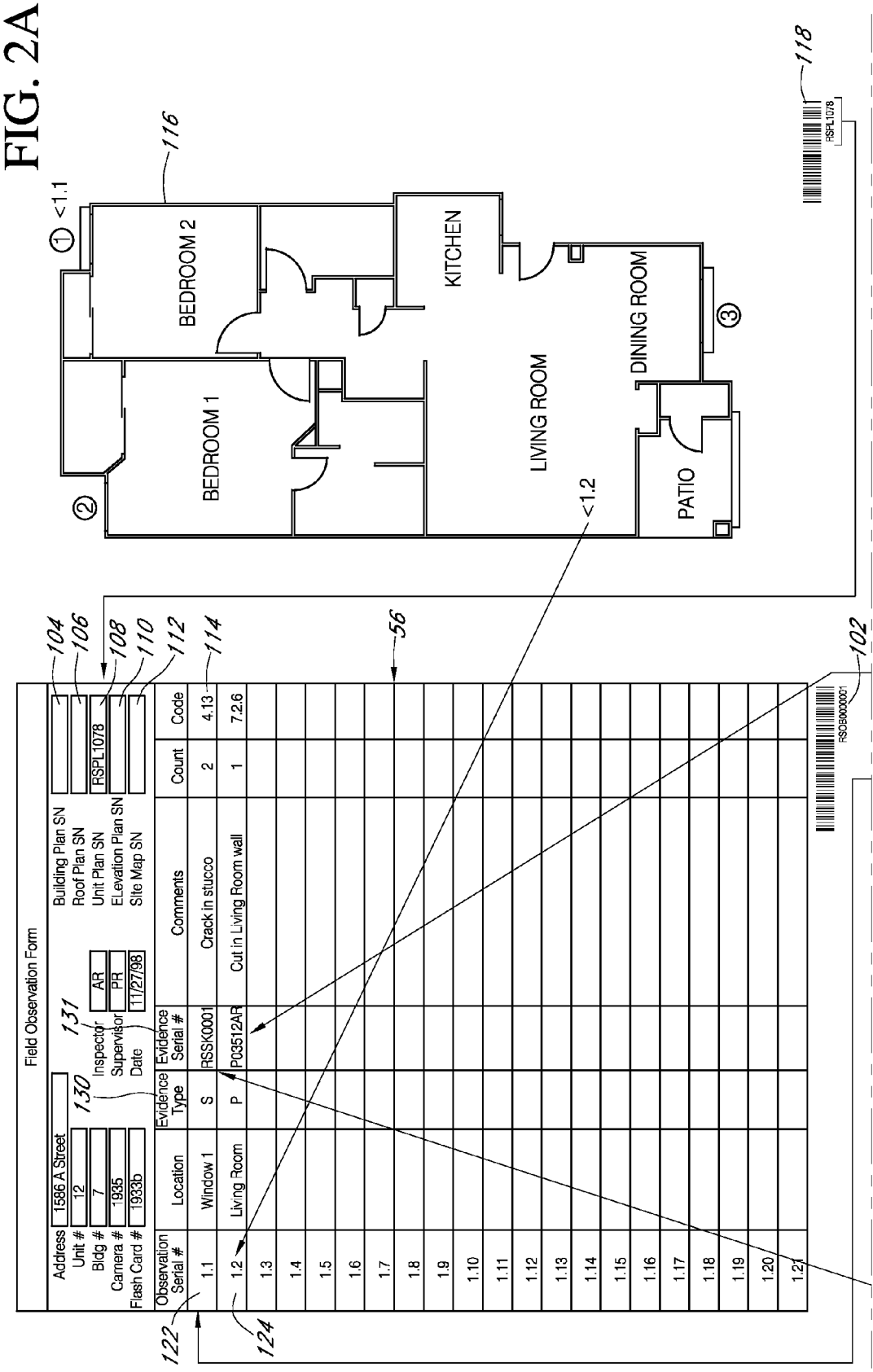
FIG. 2 is a representational diagram illustrating the relationship of various observational information tracking documents of the present invention.
Figure 2B:
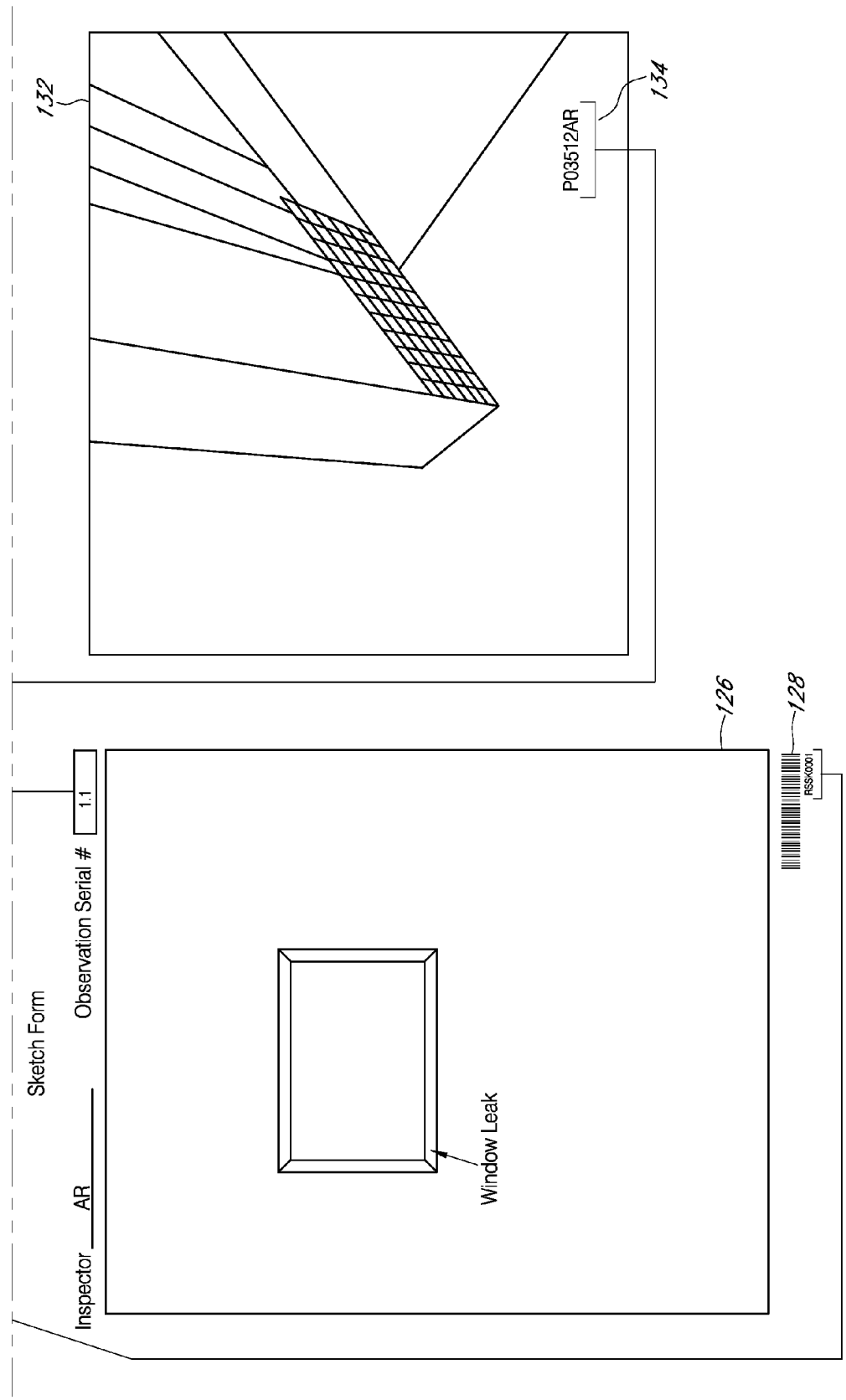

FIG. 2 illustrates an observation form 56 (FIG. 1A) which contains exemplary observational information relating to a construction defect. The inspector 50 (FIG. 1A) uses the observation form 56 to gather various construction observations in a particular building site 52 (FIG. 1A). It is noted that in one embodiment of the invention, the observation form 56 is a pre-printed paper. In another embodiment of the invention, the observation form 56 is an electronic form that can be completed in the field via the use of an electronic notepad.

Each observation form 56 includes an observation form identifier 102. The observation form identifier 102 may be any machine-readable indicia. For instance, the identifier may be: a bar code, a text string, or a number that uniquely identifies the observation form 56.

The observation form 56 includes a number of data fields. The data fields may include: a building plan data field 104, a roof plan data field 106, a unit plan data field 108, an elevation data field 110, and/or a site map data field 112. The data fields 104, 106, 108, 110, 112 are provided to hold a unique object identifier 118 that identifies a graphical representation of a physical object, such as a unit plan 116, as shown in FIG. 2, or a building plan (not shown). The object identifier 118 is annotated onto the unit plan 116. The object identifier 118 may be any indicia such as: a bar code, a text string, or a number that uniquely identifies the unit plan 116.

The observation form 56 includes data fields for the entry of observational information items that are related to the object identified by one of the data entry fields 104, 106, 108, 110, 112. The observational information items can include a defect observation code 114 representative of a particular type of defect/observation. As shown in FIG. 2, the defect code 114 for a crack in stucco, is "4.1.3." An exemplary table of defect codes is shown in Appendix A. The observational information items may also include information relating to a defect, including: a textual description, a reference to a photograph, sketch, or test or some other type of pictorial or informational representation of a defect.

It is noted that each observation form 56 can contain multiple observational information items. Each observational information item is assigned an observational identifier that is unique to each observational form 56. Exemplary observational identifiers 122, 124 each identify observational information items related to building/unit defects/observations. In FIG. 2, the observational identifier 122 is "1.1" and the observational identifier 124 is "1.2." The observational identifier for the observational information item is annotated in at least one of the graphical representations of the physical object identified by one of the data fields 104, 106, 108, 110, 112. For example, the observational information item associated with the observational identifier 122 describes a crack in the stucco by a window. The observational identifier 122 ("1.1") is marked on the unit plan 116 to show the positioning of the inspector relative to the building/unit when the inspector noted the observational information item. FIG. 2 illustrates types of observational information other than textual comments that can be recorded according to the present invention. FIG. 2 illustrates an exemplary sketch 126 having a unique sketch identifier 128. The sketch 126 is shown as being annotated with the observational identifier 122 ("1.1" in the upper right hand corner). FIG. 2 also illustrates an exemplary photograph 132 that is used to depict a building/unit defect/observation. Preferably, each of the photographs are taken with a digital camera, which automatically creates a picture identifier 134 to uniquely identify the photograph 132.

In one embodiment of the invention, each observational information item includes an evidence type data field 130. The evidence type data field 130 describes whether information other than a textual comment is contained as a part of the observational information associated with a selected observational identifier. For example, if the evidence type data field 130 contains the letter "P", the non-textual information is a photograph. If the evidence type data field 130 contains a letter "S", the non-textual information is a sketch.

Figure 3:
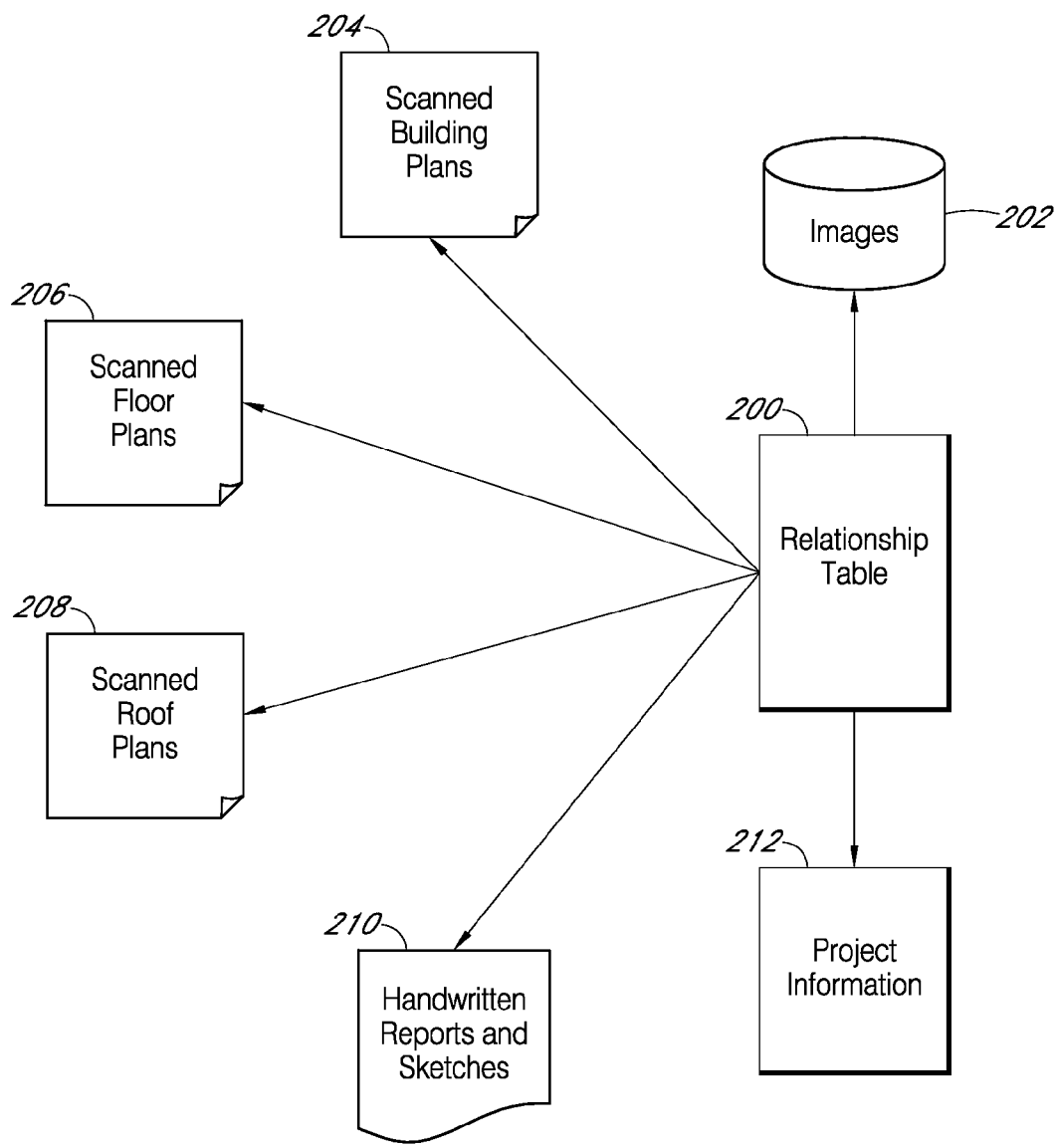
FIG. 3 is a block diagram illustrating the relationship of the observational information tracking documents of FIG. 2 to a relationship table of the present invention.

The observational information item associated with a selected observational identifier may also include a count identifier. The count identifier identifies the number of potential defects/observations associated with the observational information item. The count data allows the observation management system 62 to generate the number of times a particular defect/observation was observed. Furthermore, the observation information item may include a location identifier that identifies a particular room or part of a building/unit. In one embodiment of the invention, the location identifier is a predefined character sequence. For instance, the location identifier for item identifier 122 is shown in FIG. 2 to be "window 1." FIG. 3 is a high-level block diagram illustrating the interrelationship of the data in the observational information form 56 after the data is input into the observation management system 62 (FIG. 1A) of the invention. The present invention uses a relationship table 200 to cross-correlate the gathered information. In one embodiment of the invention, the relationship table 200 is stored in a database (not shown), such as a relational database. The relationship table 200 contains information relating the observed information items provided by the inspectors 50.

The relationship table 200 references photographs (images) 202, building plans 204, floor plans 206, roof plans 208, and handwritten reports and sketches 210 that have been entered into the computer 70 (FIG. 1B). In one embodiment of the invention, the handwritten reports and sketches 210 are manually entered into the computer 70. In another embodiment of the invention, the handwritten reports and sketches 210 are automatically read into the computer 70. The relationship table 200 also references project information 212 relating to the building/units having the potential construction defects. The project information 212 can include the address of building and the owner of the building.

Figure 4:
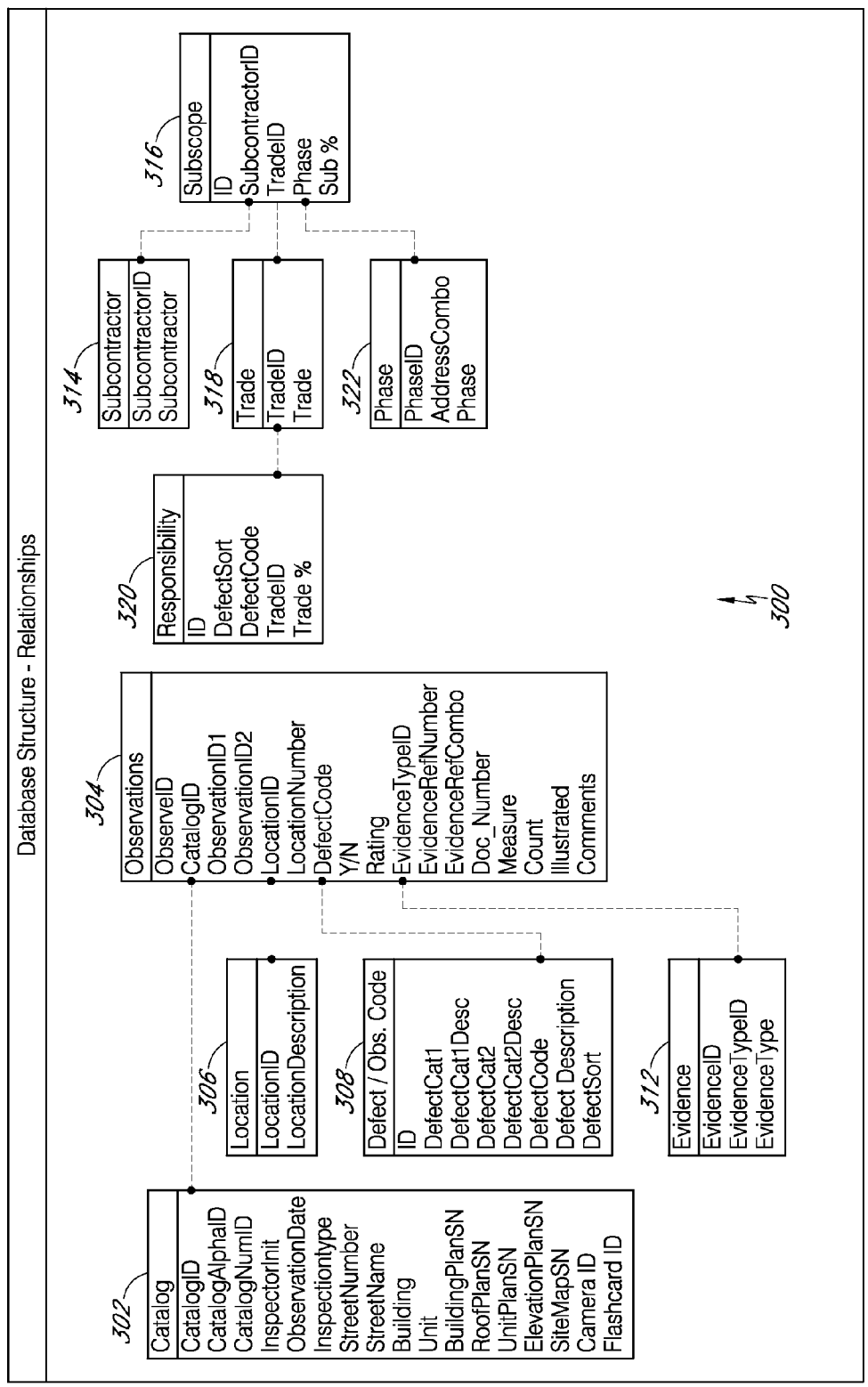
FIG. 4 is a block diagram illustrating a database schema that organizes the data contained in the observational information tracking documents of FIG. 2.

FIG. 4 illustrates an embodiment of a relationship table 200 that is implemented using a database schema 300. The database schema 300 includes a catalog table 302 for each project that is maintained by the management observation system 62. An exemplary catalog table 302 is shown in Appendix B. The catalog table 302 contains a catalog identifier, and information relating to the project such as the street number and street name of the building/unit site at issue. Further, the catalog table 302 contains the object identifiers that are contained in the data fields 104, 106, 108, 110, 112 of the observation form 56 (shown in FIG. 2).

The database schema 300 also includes an observation table 304. The observation table 304 includes the catalog identifier of the associated project. The catalog identifier links the observation table 304 to a particular catalog table 302. Typically, there are several observation tables for each catalog table 302. An exemplary observation table 304 is shown in Appendix C.

The data in the observation table 304 corresponds to the observational information in the observation form 56 (shown in FIG. 2). The observation table 306 includes a pointer to a location table 306, a defect/observation code table 308, and an evidence type table 312. The defect code table 308 includes a defect code for each construction defect. An exemplary table of defects codes is shown in Appendix A. The location table 306 includes a description of an identifier for a room. An exemplary location table is shown in Appendix D. The evidence table 312 includes a description of an identifier for an evidence type. An exemplary evidence table is shown in Appendix E.

For example, as shown in Appendix E, four evidence types are disclosed. Each of the observational information items may include evidence, such as being a picture, a sketch, a note or a test. When viewing the observational information, as will be discussed further below, each of the evidence types that is associated with each of the observational information items is readily displayed to the user. The user can view the evidence type that is associated with the observational information to readily determine what type of non-textual documentation is included in support of the observational information item.

Another aspect of the observation management system 62 (FIG. 1A) of the present invention includes a set of data tables that may be used to identify and allocate responsibility for a particular defect between various subcontractors depending on their trade and the phase of the construction that the subcontractor was a participant. The database schema 300 includes a subcontractor table 314 which includes a subcontractor identifier for each subcontractor. Appendix F sets forth an exemplary subcontractor table.

Each subcontractor is linked to a trade table 318 and a phase table 322 by a subscope table 316. The trade table 318 relates a trade to a trade identifier. Appendix G sets forth an exemplary trade table. The phase table 322 includes a description of the phases of a project. Appendix H sets forth an exemplary phase table. The subscope table 316 is used to establish a many-to-many relationship between the subcontractor and each of the trades and the phases. In projects without phases, phases may be substituted by lots, buildings or other groupings. Appendix I sets forth an exemplary subscope table. Further, each trade table 318 is linked to a responsibility table 320, that describes the defects that are assigned to each trade. Appendix J illustrates an exemplary responsibility table.

For example, referring to Appendix F, a plurality of subcontractors are each provided a subcontractor identifier. The subcontractor identifier for "Subcontractor 1" ("Bob") is "1." Now referring to Appendix I, the subscope table 316 includes an entry for each phase and for each trade that Bob was a participant. The subscope table 316 shown in Appendix I indicates that Bob worked on phases 1–6 of the project in connection with the trade identifier "1." Referring to the trade table 318 shown in Appendix G, it is seen that Bob's trade identifier of "1" indicates that one of Bob's trades is concrete. Now referring to the responsibility table 320 shown in Appendix J, since Bob's trade identifier (TradeID) is "1", it is seen that Bob is responsible for a number of defects including defects associated with the defect/observation code "1.7." According to the defect/observation code table 308 shown in Appendix A, the defect code "1.7" identifies a defect related to "Common Area Concrete Stairs/Walks."

Figure 5A:
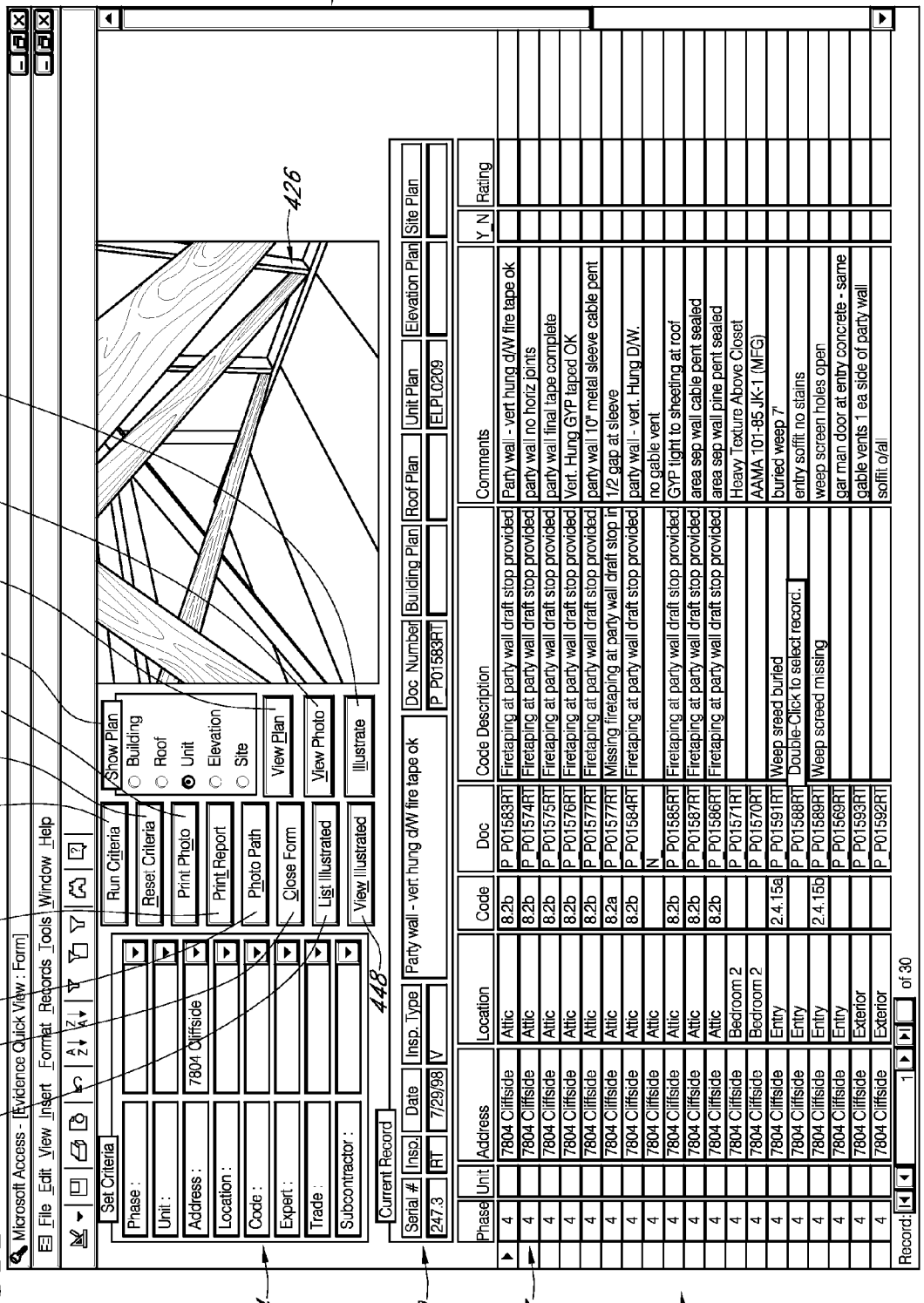
FIG. 5A is a screen display of one embodiment of the invention that allows a user to access the data in the observational information tracking documents of FIG. 2.

FIG. 5A is an exemplary screen shot of the initial user interface of the observation management system 62 (FIG. 1A) that provides access to the information gathered by the various inspectors. The screen display 400 includes an observation window 402 that contains a plurality of observational information items 403. The display order of the observational item may be sorted by a selected element of the observational information item. For example, the observational information items may be sorted by phase number (as shown in FIG. 5A). A scroll bar 401 controls which observational information items are displayed in the observation window 402.

The screen display 400 also includes a criteria window 404. The criteria window 404 allows the user to control the number and group of records that are displayed by applying one of eight criteria. For example, the user can selectively display the records having a common phase, unit or defect/observation code.

The observation management system 62 (FIG. 1A) also includes a display window 426 for the illustration of a plan relating to the construction litigation, or alternatively, the display window 426 can be used to display a photograph or a sketch relating to a particular observational item. Single clicking the display window 426 displays the illustration in a full screen view having annotation tools.

Further, the screen display 400 includes a number of control buttons to facilitate the manipulation of the items of observational information. Each of the functions represented by the control buttons may be initiated through the use of an input device, such as a mouse. Thus, if a user clicks one of the control buttons, the management observation system 62 (FIG. 1A) performs the function associated with the selected control button. The control buttons are as follows: a view plan button 430, a view photo button 431, a illustrate button 432, a run criteria button 434, a reset criteria button 436, a print photo button 438, a print report button 440, a photo path button 442, a close form button 444, a list illustrated button 446, and a view illustrated 448 button. The function of each of the buttons 430 to 448 is set forth below.

The view plan button 430 allows for the retrieval of a selected plan associated with the current observational information item 403. Using a submenu 424 that is a part of the screen display 400, a user of the observation management system 62 (FIG. 1A) can select one of several plans, such as a building plan 204 (FIG. 3), a roof plan 208 (FIG. 3), a unit plan (not shown), an elevation plan (not shown), or a site map plan (not shown) for display in the display window 426. The plans available for selection for the current observational information item 403 are identified with a white selection circle. Those not available are grayed out. After selecting a plan, the user initiates the display of the plan in the display window by selecting the view plan button 430.

The view photo button 431 allows for the full screen display of a photo or sketch of a defect in the display window 426. The illustrate button 432 allows the user to tag the current observational information item 403 for retrieval at a later time (i.e., trial or mediation). The illustrate button 432 populates the illustrated field in the observation table 304 (FIG. 4).

Figure 5B:
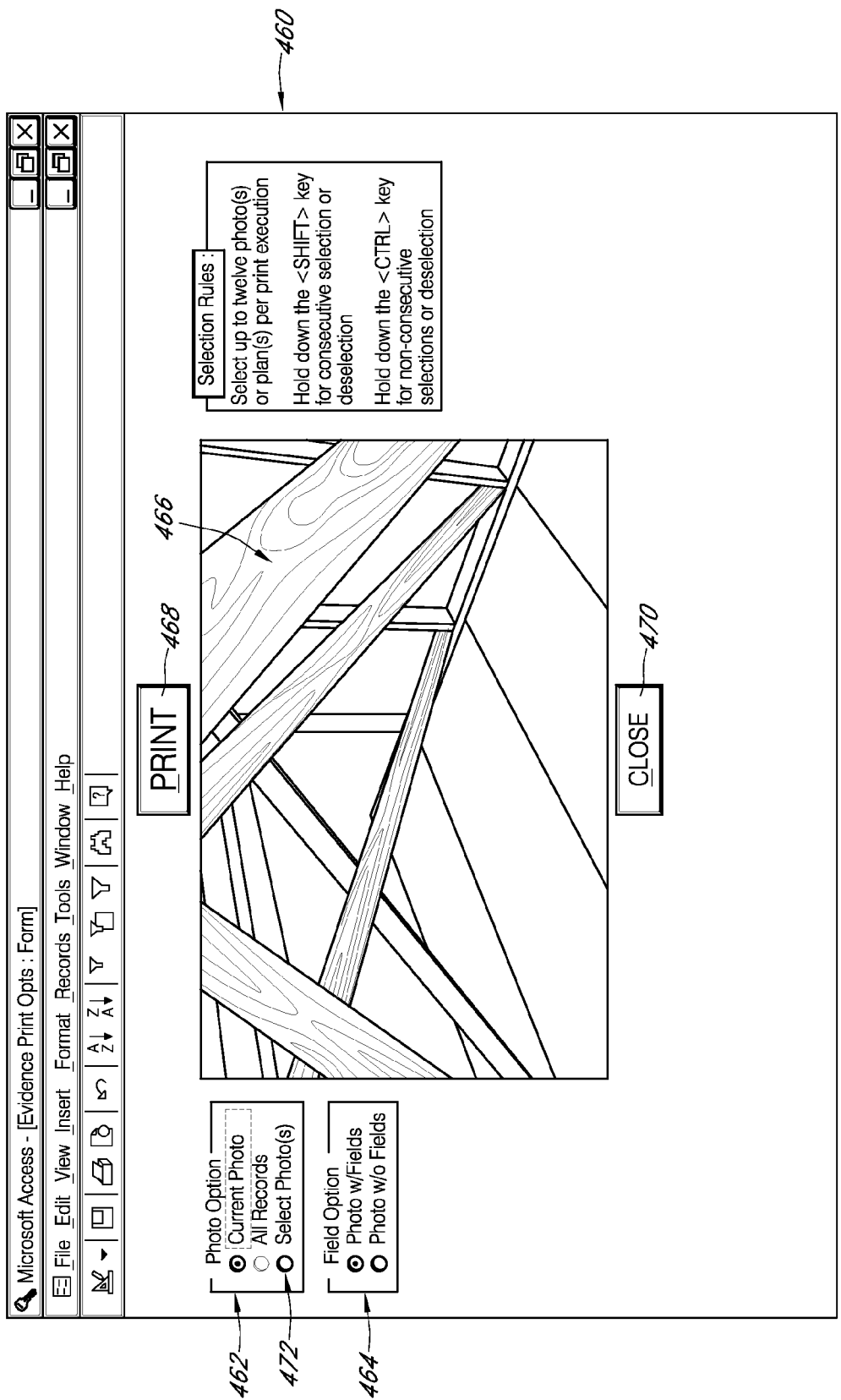
FIG. 5B is a screen display that allows a user to print a photo that is stored in the observation management system of FIG. 1A.

The print photo button 438 controls the printing of the digital object displayed in the display window 426 and displays to the user the print control screen 460 (FIG. 5B). The print control screen 460 allows the user to control the print function. The print option window 462 allows the user to print either the current photo, all photos or selected photos.

Figure 5C:
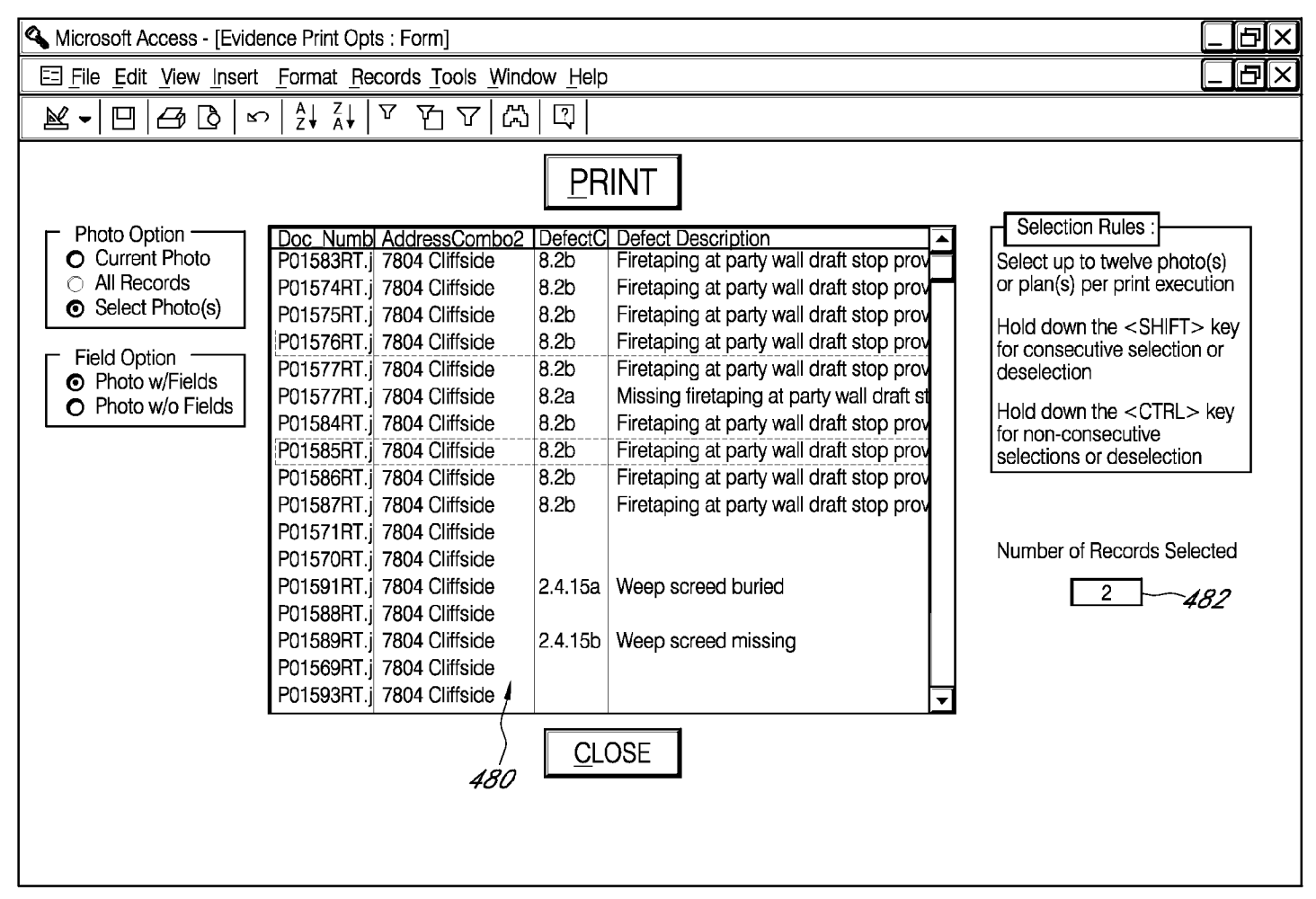

The print control screen 460 (FIG. 5B) includes a photo option window 462, a field option window 464, a display window 466 and a photo selection window 480. The photo option window 462 includes a select photo button 472. If the user selects the select photo button 472, the observation management system 62 will display a photo selection window 480 (FIG. 5C) and allow the user to select individual illustrations for printing. In one embodiment, selected items are highlighted in black. The number of records that are selected is identified in a records selected box 482 (FIG. 5C). An example of the resulting printed report is shown in FIG. 11. The field option window 464 allows the user to control whether the print includes supporting descriptive observational data or to exclude such data. The display window 466 displays the current photo.

Referring again to FIG. 5A, the run criteria button 434 allows those records matching the criteria displayed in the criteria window 404 to be displayed as a record set in the observation window 402.

The reset criteria button 436 controls the clearing of any criteria designated in the criteria window 404 and designates the first record from the observation table 304 (FIG. 4) and the catalog table 302 (FIG. 4) as the current record. The print report button 440 allows the records displayed in the observation window 402 to be printed.

The photo path button 442 allows the user to change the path required for the computer 70 (FIG. 1B) to access digitized photographs. A current record window 450 displays additional information not contained in the observation display window 402.

System Operation

Figure 6:
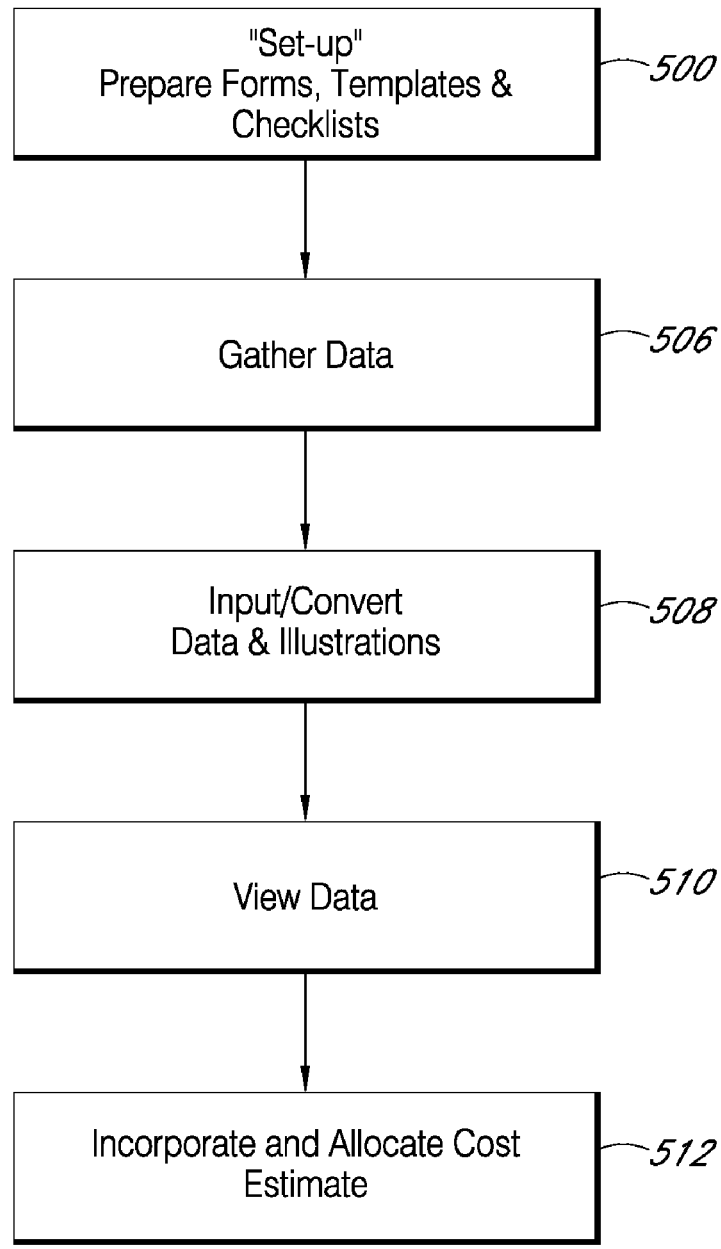
FIG. 6 is a high-level flowchart illustrating a process of the present invention for obtaining data related to the construction litigation defects, inputting the data into the computer shown in FIG. 1B, and generating various reports regarding the data.

FIG. 6 is a high-level flowchart illustrating the process and methodology by which construction litigation defect information is gathered and input into the observation management system 62 (FIG. 1A) of the present invention. Starting at state 500, various forms, such as the observation management form 56 are provided to various inspectors and engineers. The inspectors take the forms to the building(s)/unit(s) that potentially have defects or observations to be made.

Continuing to a state 506, the inspector 50 (FIG. 1A) completes the observation form 56, takes photographs, creates sketches, and annotates a map of the building site 52 (FIG. 1A) to indicate the positioning of where the inspector 50 was located when he examined the defect. The data collecting process is described below in reference to FIG. 7. Next, after all the data regarding the defects have been noted and the supporting documentation has been gathered, at a state 508, the data is input and the illustrations (i.e., photos and sketches, etc.) into the observation management system 62 (FIG. 1A).

Continuing to a state 510, a user using the observation management system 62 (FIG. 1A) views the observational information 402 (FIG. 5A) gathered by the inspector 50. The user may review notes, retrieve photographs or sketches associated with the observational information. In addition, the user may retrieve plans that show where the inspector 50 was located in relation to the building, roof, elevation unit and/or site when the observational information was obtained. Lastly, at a state 512, the observation management system 62 (FIG. 1A) allows for the allocation of costs for repairing each of the defects that have been identified by the inspectors.

Figure 7:
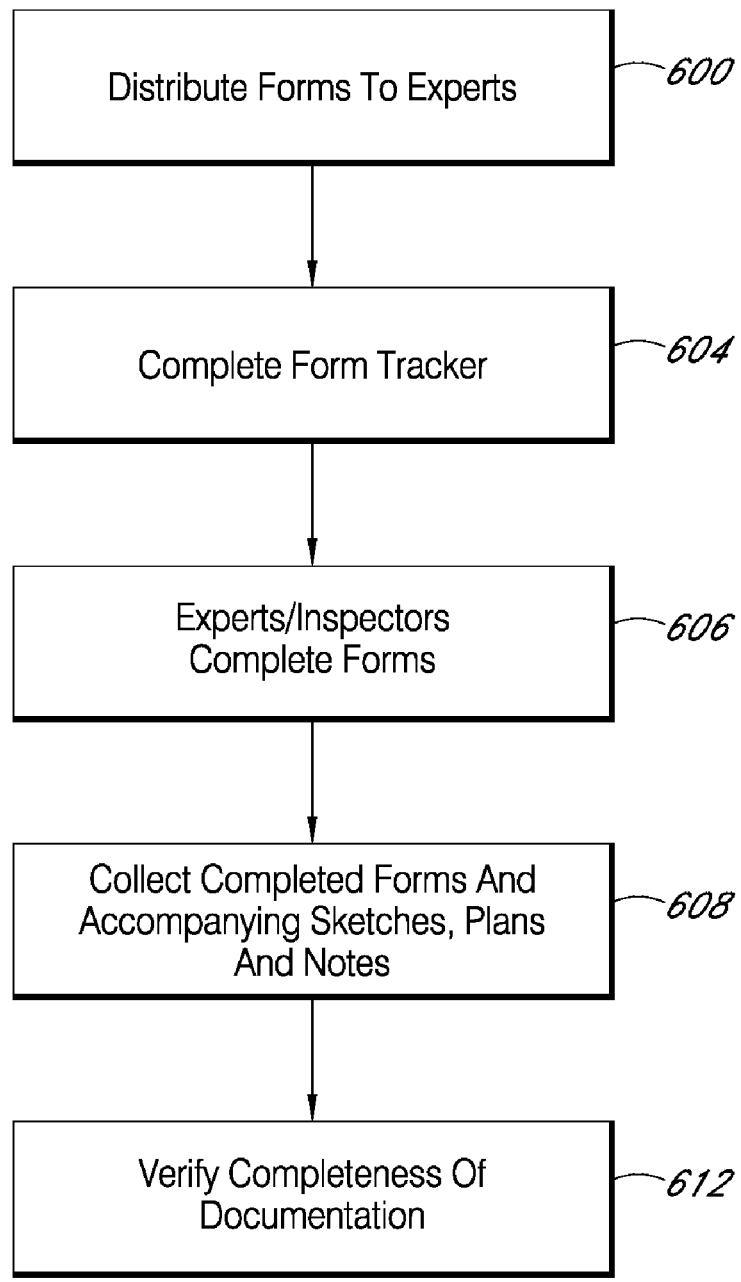
FIG. 7 is a flowchart illustrating a process for collecting data and of preparing the observational information tracking documents shown in FIG. 2.

FIG. 7 is a high level flow diagram describing in further detail state 506 of FIG. 6. FIG. 7 illustrates one embodiment of a data collecting process according to the present invention. Starting at a state 600, various data collecting forms such as FIGS. 100, 116, 126 (FIG. 2) are distributed to the inspectors 50 (FIG. 1A). The forms may include: a number of observation forms 56 (FIG. 1A), sketch forms 54 (FIG. 1A) and plans 58 (FIG. 1A). The plans 58 can include: unit plans (not shown), roof plans 208 (FIG. 3), building plans 204 (FIG. 3), elevation maps (not shown) and site maps (not shown). If the forms do not include an identifier, a sheet of adhesive labels having the identifiers may also be provided. In one embodiment of the invention, the form creation and distribution is centralized at an accounting/data management firm, Next, at a state 604, the accounting/data management firm fills out a form tracker that documents the distribution of each of the foregoing forms to ensure that the all forms can be accounted for. Moving to a state 606, the inspector 50 investigates the building/unit site 52 (FIG. 1A) and completes the forms that were distributed in the state 600. The inspector 50 (FIG. 1A) fills out the observation form 56 and describes noted defects/observations. Optionally, a sketch 54 (FIG. 1A) of the defect may be prepared or photographs 53 (FIG. 1A) of defects may be taken. Proceeding to a state 608, the completed form 56, sketches 54, photographs 53, and annotated plans 58, notes are collected from each inspector 50. Finally, at a state 612, the completeness of the documentation that has been gathered may be verified against the form tracker to verify completeness of the forms. At this point, the documentation has not yet been entered into the computer 70.

Figure 8:
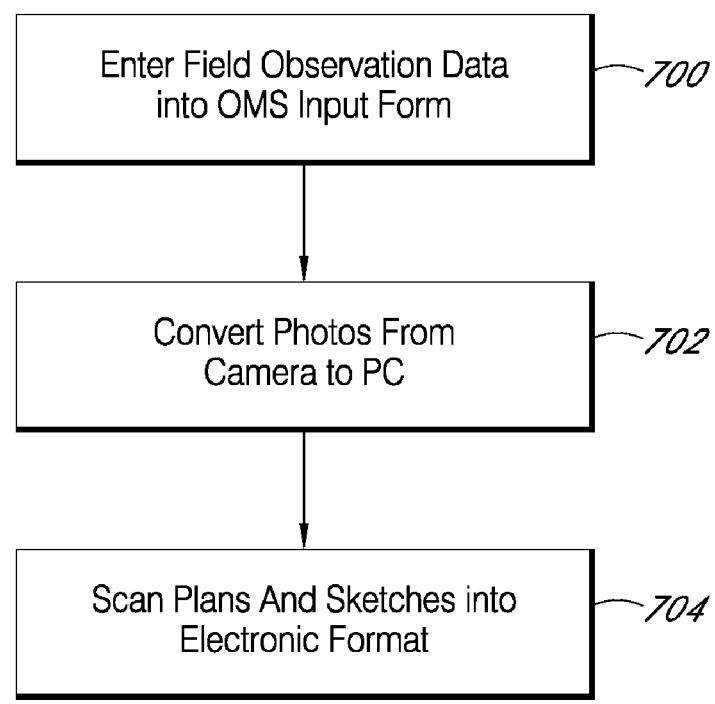
FIG. 8 is a flowchart illustrating a process for inputting the data gathered by the data collecting process of FIG. 7.

FIG. 8 is a high level flowchart illustrating the process for inputting data related to observational defects into the observation management system 62 (FIG. 1A). FIG. 8 further describes the acts that occur in state 508 of FIG. 6. Starting at a state 700, the information from each observation form 56 is entered into the observation management system 62. In one embodiment of the invention, each observation form 56 is scanned into the computer 70 (FIG. 1B) via the scanner 75. In another embodiment of the invention, each observation form 56 is manually entered into the computer 70 via a data entry person. Next, at a state 702, the photographs 53 (FIG. 1A) are stored in the observation management system 62 in a directory that is accessible by the observation management system 62. Further, depending on the file format of the digital photographs, the photographs may be converted into a file format that is readable by the observation management system. For example, in one embodiment of the invention, the digital photographs can be converted from Kodak (KDC) file format to JPEG file format using the Photo Conversion Utility sold by Kodak, Inc.

Next, at a state 704, all of the documentation relating to the construction defect litigation, such as the plans 58 (FIG. 1A), are scanned into the computer 70 (FIG. 1B) via the scanner 75 (FIG. 1B).

Figure 9:
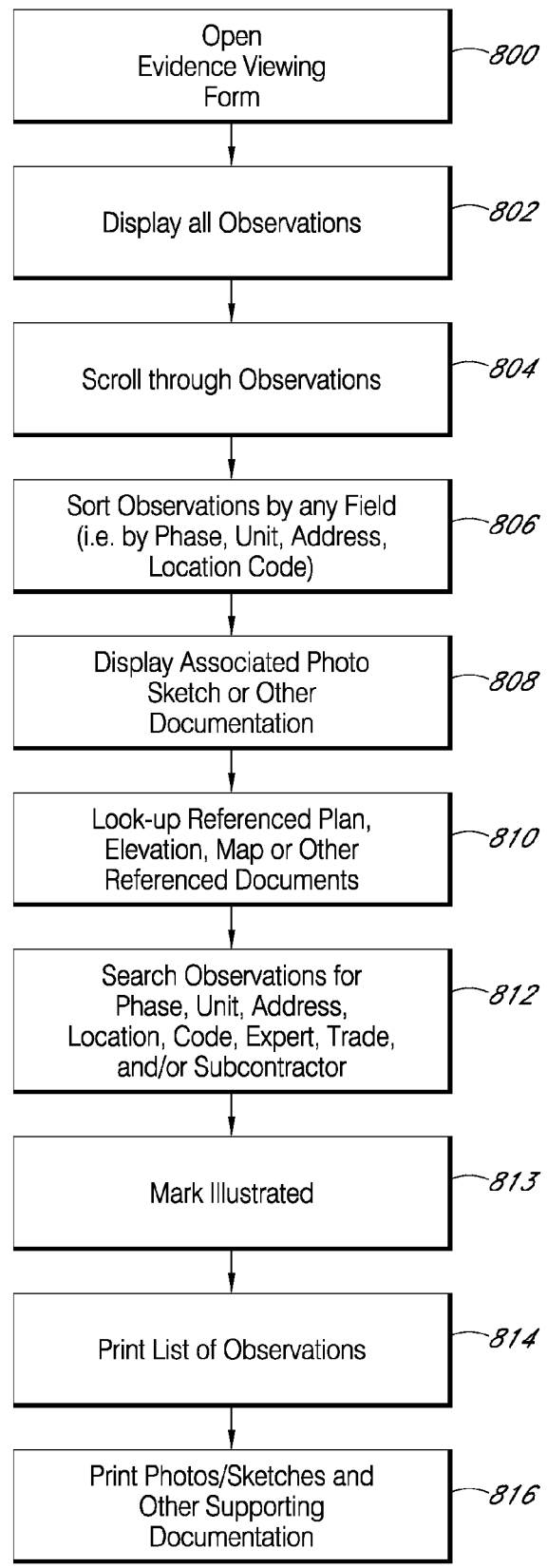
FIG. 9 is a flowchart illustrating a process for viewing the data in the observational information tracking documents gathered in the data collecting process for FIG. 7.

FIG. 9 is a high level flowchart illustrating a process for viewing the documents relating to the construction litigation once the information has been input into the observation management system 62 (FIG. 1A). FIG. 9 shows in further detail the acts that occur in state 510 of FIG. 6. States 800–816 describe various functions that are supported by the observation management system 62. A user of the observation management system 62 need not perform each of the functions described in states 800 to 816. Further, the user of the observation management system 62 may perform the functions described in the states 800 to 816 in an order that is different from the process flow described in FIG. 9.

Starting at a state 800, the user is presented with a number of projects for possible selection. As discussed above, each of the projects relate to a selected building having one or more construction defects. After the user selects one of the projects, an evidence viewing form is presented to the user. The evidence viewing form is a displayable composite of observational information items related to the selected project. An exemplary evidence viewing form is illustrated by the screen display 400 of FIG. 5A.

Continuing to a state 802, as is seen in the observation window 402 (FIG. 5A), the observation management system 62 (FIG. 1A) displays a selected portion of the observational information items to the user relating to the selected project. In one embodiment of the invention, the observational information items are displayed in the observation window 402 (FIG. 5A).

Continuing to a state 804, the user may scroll through the observational information items through the use of the scroll bar 401 (shown in FIG. 5A).

Moving to a state 806, the user can sort the observational information items that are contained in the observation management system 62 (FIG. 1A). As discussed above, the observational information items displayed in the observation window 402 may be manipulated through the use of the scroll bar 401 (FIG. 5A) and sorted by clicking on the column header.

Continuing to a state 808, the user can request the display of selected photographs 53 (FIG. 1A), sketches 54 (FIG. 1A) or other documentation relating to a selected defect by selecting the view photo button 444 (FIG. 5A) or double clicking on the current record.

Next, at state 810, by selecting the view plan button 430 (FIG. 5A), the user may also request the display of the plans 58 (FIG. 1A) or other graphical representations of the building site that shows where the inspector 50 (FIG. 1A) was located or other related notations when he recorded the observational information. The user can toggle between a picture of the defect and plan of the building where the defect was found by using the view photo button 444 (FIG. 5A) and the view plan button 430 (FIG. 5A). Further, by using the sub-menu 424 (FIG. 5A), alternative views of the building site 52 (FIG. 1A) may be selected.

Next, at a state 814, the observation management system 62 (FIG. 1A) allows the user to print a list of selected observational information items. In one embodiment of the invention, the user initiates a request to print the observational information items in report form by selecting the print reports button 440 (FIG. 5A). This report shows the observational items currently displayed in the observational window 402 (FIG. 5A) which is subject to any criteria entered into the criteria window 404 (FIG. 5A). Using the criteria window 404 (FIG. 5A) at a state 812, the user may control the number of observational information items that are displayed in the observation window 402. The criteria window 404 includes data fields for the entry of keywords. Using the keywords, the user can selectively choose which of the observational information items that are to be displayed on the display 80 (FIG. 1A). For example, as shown in FIG. 5A, a user can input the term "7804 Cliffside" in the address data field in the criteria window 404 to selectively retrieve only those observational information items that relate to that specific address. Alternatively, the user can select from amongst the observational information items based upon their associated phase, unit, address, location, observation code. Further, for example, assuming the user wanted to know all of the defects that had occurred in a selected phase. By entering the number "1" in the phase field in the criteria window 404, the user informs the observation management system 62 (FIG. 1A) to selectively retrieve only those observational information items that relate to the phase 1 of the project. More than one criteria can be used at any given time for selection. To retrieve the observational information items, a conventional database query, such as a "select" command, may be sent to the database 78 (FIG. 1A). The select command includes various parameters that identify the criteria that were identified by the user.

The printed list of the observational information items may be advantageously used in settlement negotiations with one of the subcontractors. Further, such a list can be used as evidence in a lawsuit with one of the subcontractors.

Finally, at a state 816, the observation management system 62 allows the user to print photos, sketches and/or other supporting documentation to a printer 82 (FIG. 1A). In one embodiment of the invention, the user initiates a request for the printing of the picture that is displayed in the viewing window 426 (FIG. 5A) by selecting the print photo button 438, the observation management system 62 displays the print control screen 460 (FIG. 5B). Using the print control screen 460, the user can control whether the observation management system 62 prints the current photo/sketch, all photos/sketches or selected photos. If the user chooses to printed selected photos (using the selected photos button), the observation management system 62 presents the user the screen as shown in FIG. 5C. Using an input device, such as the keyboard 76 (FIG. 1A), a user can select which of the Figures are to be presented. Such printed information may be used to support a claim against one of the subcontractors by a general contractor and/or the owner of the building having the defect.

Figure 10:
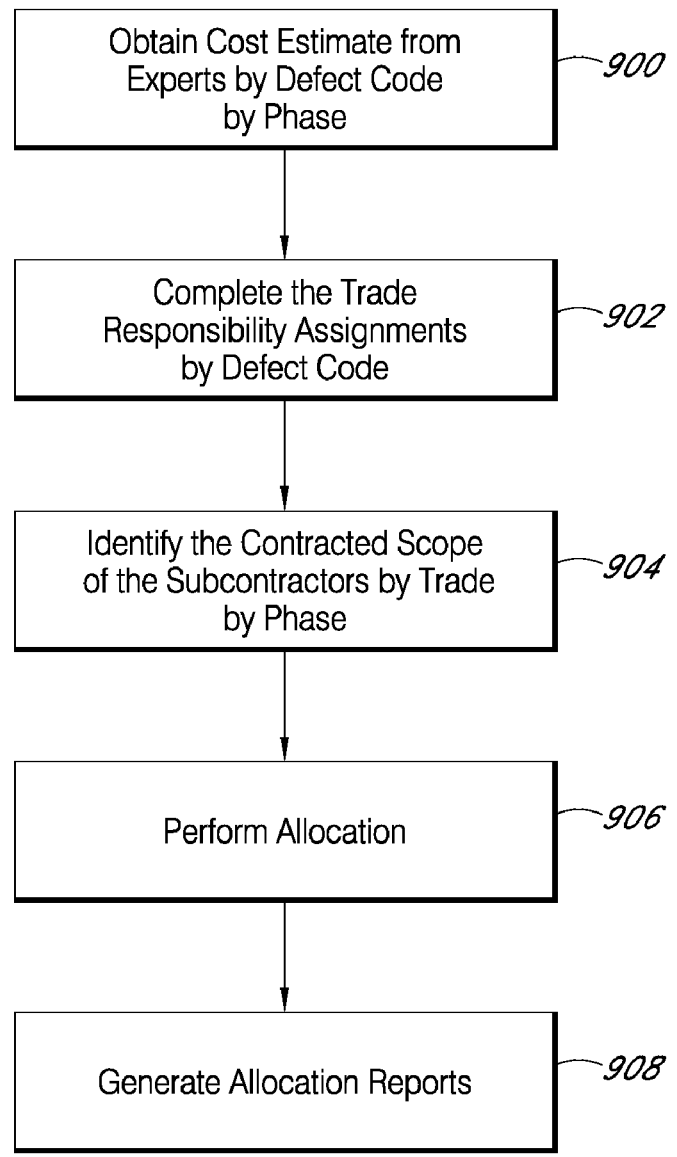
FIG. 10 is a flowchart illustrating an allocation process that determines the respective responsibilities of various subcontractors for repairing a defect depending on the subcontractor's trade.

FIG. 10 is a flowchart describing the process by which the observation management system 62 (FIG. 1A) generates allocation reports that describe the responsibility of various subcontractors for the potential or actual cost of repairing the defects that were identified in the data collecting stage 506 of FIG. 6. FIG. 10 further illustrates the acts that occur in state 512 of FIG. 6.

Starting in a state 900, a cost estimate for repairing each coded defect by phase is input into the observation management system 62. In one embodiment of the invention, the cost information is stored in its own data table (not shown).

Next, at a state 902, a determination is made to which trades are responsible for correcting the defect. The trade responsibility determination may be made by experts 66 (FIG. 1A) during their review and use of the information contained and reported in the observation management system 62. Once the responsibility determination is made, the subscope table 320 (Appendix I) is prepared. The subscope table identifies the party (in this example a subcontractor) that was responsible for each trade and in each phase of construction of the buildings. In some instances, it may be necessary depending on the engagement to associate the responsibility of the defects with the subcontractors in a more other ways than by phase (i.e., by lot). For each defect, one or more trade identifiers are input into the responsibility table 320 (shown in Appendix J).

Moving to a state 906, the percentage of responsibility for each subcontractor is calculated by the observation management system 62. The observation management system 62 selects the estimated or actual cost of repair for each defect and, in this example, for each phase to the trades identified in Appendix J. The observation management system 26 then splits the costs to the identified subcontractor based on the subcontractor percentages and according to the trade percentages. Moving to a state 908, an allocation report may be generated for submission to the subcontractor and other users. An exemplary allocation report is set forth in Appendix K. In one embodiment of the invention, the allocation report is standard report that is used by insurers, accountants, and attorneys that are involved in construction defect litigation. The allocation report can be sorted and reported by subcontractor or by defect code.

The present invention advantageously provides for the full-text retrieval of documents relating to construction litigation. The data schema 300 of the invention organizes each of the observational information items, such that once the observational information items are stored in the database 78, they may be easily retrieved. Once a selected observational information item has been identified, a user can almost instantaneously retrieve supporting documentation relating to the observational information. For example, the user can display or print a photograph or a sketch that depict the defect. In addition, the user can display or print a plan that depicts where the inspector 50 (FIG. 1A) was located, when the inspector noted the defect.

The present invention also advantageously provides for the generation of reports using the defect information that has been gathered by the inspector 50. The observation management system 62 (FIG. 1A) provides for the ability to associate a cost to repair the defects with each of the defects. Once the repair costs are determined, a report may be generated that show the subcontractors that are responsible for correcting the defect.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

Appendixes Overview

Appendixes A through K include various exemplary data tables and reports that may used in connection with one embodiment of the present invention. It is noted that due to space limitations, the data tables and reports in Appendixes A, B, and C are each vertically partitioned into two sections.

Appendix A

| ID | DefectCat1 | DefectCat1Desc | DefectCat2 | DefectCat2Desc |
|---|---|---|---|---|
| 1 | 1.0 | Civil Issues | 1.7 | Common Area Concrete Stairs/Walks |

-continued

| ID | DefectCat1 | DefectCat1Desc | DefectCat2 | DefectCat2Desc |
|---|---|---|---|---|
| 2 | 1.0 | Civil Issues | 1.7 | Common Area Concrete Stairs/Walks |
| 3 | 1.0 | Civil Issues | 1.7 | Common Area Concrete Stairs/Walks |
| 4 | 1.0 | Civil Issues | 1.7 | Common Area Concrete Stairs/Walks |
| 5 | 1.0 | Civil Issues | 1.7 | Common Area Concrete Stairs/Walks |
| 6 | 1.0 | Civil Issues | 1.7 | Common Area Concrete Stairs/Walks |
| 7 | 1.0 | Civil Issues | 1.7 | Common Area Concrete Stairs/Walks |
| 8 | 1.0 | Civil Issues | 1.7 | Common Area Concrete Stairs/Walks |
| 9 | 1.0 | Civil Issues | 1.7 | Common Area Concrete Stairs/Walks |
| 10 | 1.0 | Civil Issues | 1.7 | Common Area Concrete Stairs/Walks |
| 11 | 1.0 | Civil Issues | 1.7 | Common Area Concrete Stairs/Walks |
| 12 | 1.0 | Civil Issues | 1.7 | Common Area Concrete Stairs/Walks |
| 13 | 1.0 | Civil Issues | 1.7 | Common Area Concrete Stairs/Walks |
| 14 | 1.0 | Civil Issues | 1.7 | Common Area Concrete Stairs/Walks |

| DefectCode | DefectDescription | DefectSort |
|---|---|---|
| 1.7 | Common Area Concrete Stairs/Walks | 5 |
| 1.7.1 | Excessive Variation in Riser Heights | 10 |
| 1.7.1a | Variation at lower riser | 15 |
| 1.7.1b | Variation at upper riser | 20 |
| 1.7.1c | Variation with-in run of stair flight | 25 |
| 1.7.1d | No excessive variation over ⅜" in riser height | 30 |
| 1.7.1e | No excessive variation over ½" int riser height | 35 |
| 1.7.2 | Stair Rail Post Corrosion | 40 |
| 1.7.2a | Corrosion at stair rail post base | 45 |
| 1.7.2b | Void/ponding around stair rail post base | 50 |
| 1.7.2c | Corrosion in field of stair rail | 55 |
| 1.7.3 | Missing Handrails | 60 |
| 1.7.3a | Number of risers (3 or less don't require a handrail) | 65 |
| 1.7.3b | Missing handrail | 70 |

Appendix B

| Catalog ID | Catalog AlphaID | Catalog NumID | Inspector Init | Observation Date | Inspection Type | Street Number | Street Name |
|---|---|---|---|---|---|---|---|
| 4 | ELOB | 11 | RP | 6/23/98 | DT | 700 | Wheat Ridge Lane |
| 5 | ELOB | 36 | RP | 6/24/98 | DT | 7811 | Gable |
| 6 | ELOB | 14 | RP | 6/23/98 | DT | 7815 | Settlers Ridge |
| 7 | ELOB | 10 | CC | 6/24/98 | DT | 512 | Yacht Harbor Drive |
| 8 | ELOB | 23 | CC | 6/24/98 | DT | 7811 | Gable |
| 9 | ELOB | 6 | CC | 6/23/98 | DT | 700 | Wheat Ridge Lane |
| 10 | ELOB | 17 | CC | 6/23/98 | DT | 7815 | Settlers Ridge |
| 11 | ELOB | 16 | CC | 6/23/98 | DT | 7900 | Foxwood |
| 12 | ELOB | 9 | CC | 6/25/98 | DT | 7901 | Idledale |
| 13 | ELOB | 41 | JP | 6/26/98 | DT | 745 | Wheat Ridge Lane |
| 14 | ELOB | 38 | JP | 6/25/98 | DT | 7800 | Cliffside |

| Building | Unit | Building PlanSN | RoofPlan SN | UnitPlan SN | Elevation SN | Camera ID | Flashcard ID |
|---|---|---|---|---|---|---|---|
| 0 | 201 | | ELRP0001.tif | | | 1936 | 1 |
| 0 | | | | ELUP0011.tif | | 1936 | 4 |
| 0 | | | ELRP0002.tif | | | 1936 | 1 |
| 0 | 203 | | | ELUP0006.tif | | 1934 | 7 |
| 0 | | | | ELUP0010.tif | | 1934 | 7 |
| 0 | 201 | | | ELUP0002.tif | | 0 | 7 |
| 0 | | | | ELUP0007.tif | | 0 | 7 |
| 0 | 103 | | | ELUP0005.tif | | 0 | 7 |
| 0 | 202 | | | ELUP0014.tif | | 1934 | 7 |
| 0 | 202 | | ELRP0008.tif | ELUP0018.tif | | 1933 | 2 |
| 0 | | | ELRP0007.tif | | | 1933 | 5 |

Appendix C

| Observ ID | Catalog ID | Observation ID1 | Observation ID2 | Location ID | Location Number | Defect Code | Y/N | Rating | Evidence Type ID |
|---|---|---|---|---|---|---|---|---|---|
| 1 | 34 | 270 | 11 | 111 | | | | | P |
| 2 | 35 | 211 | 1 | 124 | | | | | P |
| 3 | 34 | 270 | 12 | 138 | | | | | P |
| 4 | 34 | 270 | 13 | 11 | | | | | P |
| 5 | 34 | 270 | 14 | 12 | | | | | P |
| 6 | 34 | 270 | 15 | 12 | | | | | P |
| 7 | 34 | 271 | 1 | 12 | | | | | P |
| 8 | 34 | 271 | 2 | 12 | | | | | P |
| 9 | 34 | 271 | 3 | 12 | | | | | P |

| Evidence RefNumber | Evidence RefCombo | Doc_ Number | Measure1 | Measure2 | Illustrated | Comments |
|---|---|---|---|---|---|---|
| P001601 | P01601MH | P01601mh.jpg | | | X | Overall Kitchen |
| P001326 | P01326JH | P01326JH.jpg | | | | Address |
| P001602 | P01602MH | P01602mh.jpg | | | | Master Bath Shower Stain @ Baseboard/ Grout OK |
| P001603 | P01603MH | P01603mh.jpg | | | | Attic Scuttle 22 1/2 × 31 RO; 21 × 28 FO |
| P001604 | P01604MH | P01604mh.jpg | | | | (1) Layer 5/8" no fire tape |
| P001605 | P01605MH | P01605mh.jpg | | | X | L2J GYP voids @ gable vent |
| P001606 | P01606MH | P01606mh.jpg | | | | no firetape |

-continued

| Evidence RefNumber | Evidence RefCombo | Doc_Number | Measure1 | Measure2 | Illustrated | Comments |
|---|---|---|---|---|---|---|
| P001607 | P01607MH | P01607mh.jpg | | | | vert dropwall |
| P001608 | P01608MH | P01608mh.jpg | | | | looking @ entry |

Appendix D

| LocationID | LocationDescription |
|---|---|
| 1 | Attic - Back of Garage |
| 2 | Attic PW |
| 3 | Attic - Garage |
| 5 | Test Area |
| 6 | Roof Overall |
| 7 | Intermediate Stair Landing 201 |
| 8 | Intermediate Landing |
| 9 | Address |
| 10 | Front Elevation |
| 11 | Master Bedroom Closet |
| 12 | Attic |
| 13 | Garage |
| 14 | Unit Interior |
| 15 | Garage Interior |
| 16 | Roof Test Area |
| 17 | Adj Roof Area to Test Area |
| 18 | Attic - Kitchen Back Wall |
| 19 | Attic - Storage Wall |
| 20 | Attic - PW |
| 21 | Attic - Garage Rear Wall |
| 22 | Attic - Above Garage P.W. |
| 23 | Attic - Above Garage Left Side Wall |
| 24 | Garage - Left Side Wall |
| 25 | Attic - Master Bath |

Appendix E

| EvidenceID | EvidenceTypeID | EvidenceType |
|---|---|---|
| 1 | P | Photo |
| 2 | Sk | Sketch |
| 3 | N | Note |
| 4 | T | Test |

Appendix F

| SubcontractorID | Subcontractor |
|---|---|
| 1 | Subcontractor 1 |
| 2 | Subcontractor 2 |
| 3 | Subcontractor 3 |
| 4 | Subcontractor 4 |
| 5 | Subcontractor 5 |
| 6 | Subcontractor 6 |
| 7 | Subcontractor 7 |
| 8 | Subcontractor 8 |
| 9 | Subcontractor 9 |
| 10 | Subcontractor 10 |
| 11 | Subcontractor 11 |
| 12 | Subcontractor 12 |
| 13 | Subcontractor 13 |

-continued

| SubcontractorID | Subcontractor |
|---|---|
| 14 | Subcontractor 14 |
| 15 | Subcontractor 15 |
| 16 | Subcontractor 16 |
| 17 | Subcontractor 17 |
| 18 | Subcontractor 18 |
| 19 | Subcontractor 19 |
| 20 | Subcontractor 20 |
| 21 | Subcontractor 21 |
| 22 | Subcontractor 22 |
| 23 | Subcontractor 23 |
| 24 | Subcontractor 24 |
| 25 | Subcontractor 25 |

Appendix G

| TradeID | Trade |
|---|---|
| 1 | Concrete |
| 2 | Decks |
| 3 | Doors |
| 4 | Drywall |
| 5 | Electrical |
| 6 | Framing |
| 7 | Landscaping |
| 8 | Masonry |
| 9 | Paving |
| 10 | Stucco |
| 11 | Painting |
| 12 | Plumbing |
| 13 | Rails/Stairs |
| 14 | Roofing |
| 15 | Sheet Metal |
| 16 | Window Installation |
| 17 | HVAC |
| 18 | Waterproofing |
| 19 | Window Supplier |

Appendix H

| PhaseID | AddressCombo | Phase |
|---|---|---|
| 1 | Building 700 Unit 102 | 1 |
| 2 | Clubhouse | 1 |
| 3 | SITE MAP | 1 |
| 4 | 0 | |
| 5 | 1703 Oakstone | 1 |
| 6 | 1705 Oakstone | 1 |
| 7 | 7904 Ryandale Unit 202 | 1 |
| 8 | 7901 Idledale | |
| 9 | 500 Yacht Harbor Drive | 1 |
| 10 | 512 Yacht Harbor Drive Unit 201 | 1 |
| 11 | 512 Yacht Harbor Drive Unit 202 | 1 |
| 12 | 512 Yacht Harbor Drive Unit 203 | 1 |

-continued

| PhaseID | AddressCombo | Phase |
|---|---|---|
| 13 | 513 Yacht Harbor Drive | 1 |
| 14 | 533 Yacht Harbor Drive | 1 |
| 15 | 553 Yacht Harbor Drive | 1 |
| 16 | 600 Devonhall | 5 |
| 17 | 601 Foxwood | 1 |
| 18 | 601 Harvest Run | 5 |
| 19 | 601 Harvest Run Unit 103 | 5 |
| 20 | 605 Devonhall Unit 102 | 5 |
| 21 | 613 Yacht Harbor Drive | 1 |
| 22 | 6289 Grey Crest | 1 |
| 23 | 629 Yacht Harbor Drive | 1 |
| 24 | 636 Yacht Harbor Drive | 1 |
| 25 | 636 Yacht Harbor Drive Unit 203 | 1 |
| 26 | 700 Wheat Ridge Lane | 5 |

Appendix I

| ID | SubcontractID | Sub % | TradeID | Phase |
|---|---|---|---|---|
| 1 | 1 | 100 | 1 | 1 |
| 2 | 1 | 100 | 1 | 2 |
| 3 | 1 | 100 | 1 | 3 |
| 4 | 1 | 100 | 1 | 4 |
| 5 | 1 | 100 | 1 | 5 |
| 6 | 1 | 100 | 1 | 6 |
| 7 | 1 | 100 | 2 | 7 |
| 8 | 1 | 50 | 2 | 8 |
| 9 | 2 | 100 | 2 | 1 |
| 10 | 25 | 100 | 2 | 2 |
| 11 | 25 | 100 | 2 | 3 |
| 12 | 25 | 100 | 2 | 4 |
| 13 | 25 | 100 | 2 | 5 |
| 14 | 25 | 100 | 2 | 6 |
| 15 | 25 | 100 | 2 | 7 |
| 16 | 25 | 100 | 2 | 8 |
| 17 | 25 | 100 | 3 | 1 |
| 18 | 25 | 100 | 3 | 2 |
| 19 | 25 | 100 | 3 | 3 |
| 20 | 25 | 100 | 3 | 4 |
| 21 | 25 | 100 | 3 | 5 |
| 22 | 25 | 100 | 3 | 6 |
| 23 | 25 | 100 | 3 | 7 |
| 24 | 25 | 100 | 3 | 8 |
| 25 | 10 | 100 | 4 | 1 |

Appendix J

| ID | DefectSort | DefectCode | TradeID | Trade % |
|---|---|---|---|---|
| 1 | 5 | 1.7 | 1 | 100 |
| 2 | 10 | 1.7.1 | 1 | 50 |
| 3 | 15 | 1.7.1a | 1 | 100 |
| 4 | 20 | 1.7.1b | 1 | 100 |
| 5 | 25 | 1.7.1c | 1 | 100 |
| 6 | 30 | 1.7.1d | 1 | 100 |
| 7 | 35 | 1.7.1e | 1 | 100 |
| 8 | 40 | 1.7.2 | 13 | 100 |
| 9 | 45 | 1.7.2a | 13 | 100 |
| 10 | 50 | 1.7.2b | 13 | 100 |
| 11 | 55 | 1.7.2c | 13 | 100 |
| 12 | 60 | 1.7.3 | 13 | 100 |
| 13 | 65 | 1.7.3a | 13 | 100 |
| 14 | 70 | 1.7.3b | 13 | 100 |
| 15 | 75 | 1.7.3c | 13 | 100 |
| 16 | 80 | 2.1 | 2 | 100 |

-continued

| ID | DefectSort | DefectCode | TradeID | Trade % |
|---|---|---|---|---|
| 17 | 85 | 2.1.1 | 2 | 100 |
| 18 | 90 | 2.1.1a | 2 | 100 |
| 19 | 95 | 2.1.1b | 2 | 100 |
| 20 | 100 | 2.1.1c | 2 | 100 |
| 21 | 105 | 2.1.1d | 2 | 100 |
| 22 | 110 | 2.1.1e | 2 | 100 |
| 23 | 115 | 2.1.2 | 2 | 100 |
| 24 | 120 | 2.1.2a | 2 | 50 |
| 25 | 125 | 2.1.2b | 2 | 100 |
| 26 | 130 | 2.1.2c | 2 | 100 |

Appendix K

| Issue | Amount | Trade | Trade % | Sub ID | Sub % | Amount |
|---|---|---|---|---|---|---|
| 7.0 Civil Issues | | | | | | |
| 7.1 Common Area Concrete | | | | | | |
| 7.1.1 Excessive variation in riser heights | $200,000 | (1) stucco | 50% | 1 | 100 | $100,000 |
| | | (2) concrete | 50% | 25 | 25 | $25,000 |
| | | (2) concrete | 50% | 25 | 75 | $75,000 |

What is claimed is:

1. A method of organizing information in a computer, comprising:
   assigning a bar code to a floor plan schematic of a building;
   providing an item of observational information that is related to a construction defect of the building, wherein the defect is classified into one of a plurality of defect types;
   assigning an identification code to the item of observational information;
   annotating the floor plan schematic with the identification code;
   scanning the floor plan schematic thereby creating a digital representation of the floor plan schematic;
   associating in a table in the computer the bar code to the identification code; and
   displaying, in response to a user request, the digital representation of the floor plan schematic annotated with the identification code and the item of observational information, wherein the defect type and the identification code are displayed.

2. The method of claim 1, additionally comprising assigning a defect code to the item of observational information.

3. The method of claim 1, wherein the item of observational information includes a textual description of the physical defect.

4. The method of claim 1, wherein the item of observational information includes a photograph.

5. The method of claim 1, wherein the a number identification code is located on the floor plan schematic.

6. The method of claim 1, wherein associating in the computer the bar code to the identification code includes storing the bar code and the identification code in a relational database.

7. A program storage device storing instructions that when executed perform the method comprising:
   assigning an object identifier to a graphical representation of a building, wherein the object identifier uniquely identifies a document;
   receiving a request for the display of an observational information item relating to the building, wherein the observational information item includes construction defect information regarding the building;
   assigning an identification code to the observational information item, wherein the identification code corresponds with one of a plurality of defect types;
   scanning a floor plan schematic of the building thereby creating a digital representation of the floor plan schematic;
   associating, in a table in the computer, the object identifier to the observational information item; and
   displaying the observational information item, the digital representation of the floor plan schematic, and the identification code; and
   displaying an annotated graphical representation of the building that describes the view associated with the observational information item.

8. A method of organizing information in a computer, comprising:
   assigning an object identifier to a graphical representation of a building, wherein the object identifier uniquely identifies a document;
   providing at least one item of observational information that describes a characteristic of the physical object, wherein the observational information includes location information for the building, and wherein the observational information includes defect information regarding the building;
   assigning at least one observational identifier to the item of observational information, wherein the observational identifier corresponds with one of a plurality of defect types;
   scanning the graphical representation of the building thereby creating a digital representation of the graphical representation;
   associating, in a table in the computer, the object identifier to the observational identifier; and
   displaying the scanned graphical representation of the building.

9. The method of claim 8, additionally comprising:
   selecting one of the items of observational information; and
   displaying the graphical representation of the building.

10. The method of claim 8, additionally comprising:
    selecting one of the items of observational information; and
    displaying the selected item of observational information.

11. The method of claim 8, additionally comprising assigning a defect code to the item of observational information.

12. The method of claim 8, wherein the object identifier is a bar code number.

13. The method of claim 8, wherein the graphical representation is a floor plan schematic.

14. The method of claim 8, wherein the item of observational information includes a textual description of a construction defect.

15. The method of claim 8, wherein the item of observational information includes a photograph.

16. The method of claim 8, wherein the observational identifier is a number.

17. The method of claim 8, wherein associating, in the computer, the object identifier to the observational identifier includes storing the object identifier and the observational identifier in a relational database.

18. A method of organizing information in a computer, comprising:
    assigning a bar code to a graphical representation of a product;
    providing an item of observational information that is related to the product;
    assigning an identification code to the item of observational information, wherein the identification code is classified into one of a plurality of defect types;
    annotating the graphical representation with the identification code;
    scanning the graphical representation thereby creating a digital representation of the graphical representation;
    associating in a table in the computer the bar code to the identification code; and
    displaying, in response to a user request, the digital graphical representation annotated with the identification code and the item of observational information.

* * * * *